J. SLOAN.
Alcohol Still.
No. 26,877.
Patented Jan'y 17, 1860.
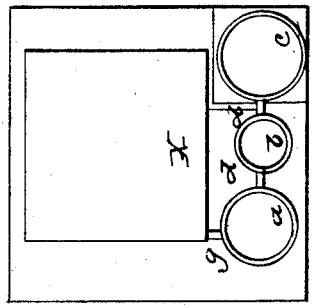
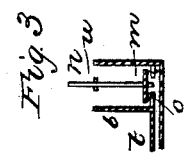
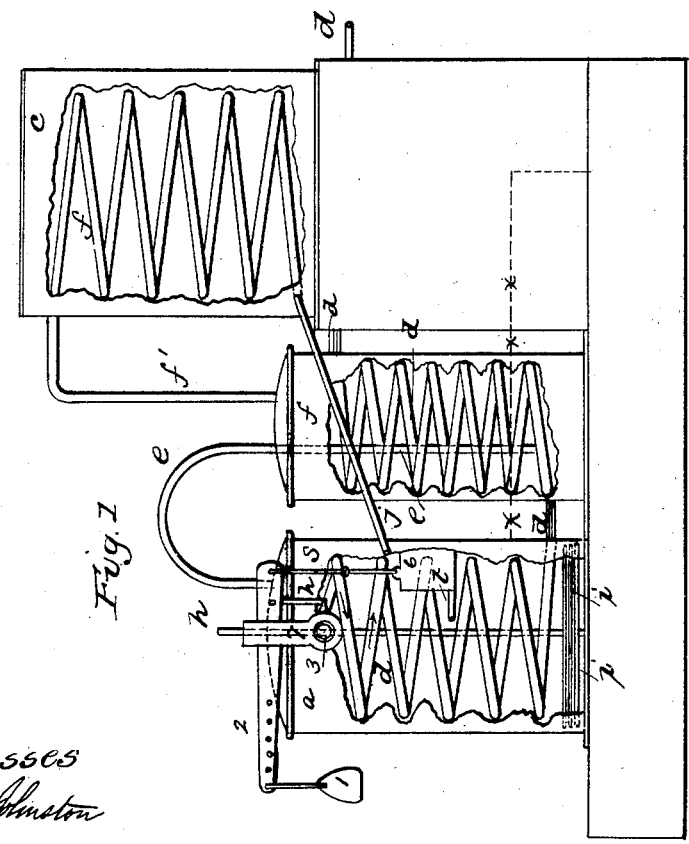
Witnesses
James J. Johnston
George P. Steck
Inventor
John Sloan

UNITED STATES PATENT OFFICE.

JOHN SLOAN, OF PITTSBURG, PENNSYLVANIA, ASSIGNOR TO E. H. DIERKER AND WM. WASSELL, OF SAME PLACE.

IMPROVEMENT IN DISTILLING APPARATUS.

Specification forming part of Letters Patent No. 26,877, dated January 17, 1860.

*To all whom it may concern:*

Be it known that I, JOHN SLOAN, of the city of Pittsburg, in the county of Allegheny and State of Pennsylvania, have invented a new and Improved Apparatus for Distilling and Brewing; and I do hereby declare that the following is a full and exact description thereof, reference being had to the accompanying drawings, and to the letters of reference marked thereon.

The nature of my invention consists in an arrangement of a heating-pipe, condensing-pipe, governor, and conducting-pipes in connection with distilling, brewing, and cooling vessels, the whole being constructed and arranged substantially as hereinafter described.

To enable others skilled in the art to make and use my invention, I will proceed to describe its construction and operation.

In the accompanying drawings, Figure 1 is a side view of my whole arrangement, representing a portion broken out of the side of the distilling, brewing, and cooling vessel. Fig. 2 is a top view representing the arrangement of the vessels. Fig. 3 is a sectional view of the bucket of the governor.

The governor consists of a weight, 1, lever 2, valve 3, valve-rod 4, bucket-rod 5, bucket 6, and support-stand 7. The bucket is furnished with a valve, $m$, valve-seat $o$, and pipe $r$. A piece, $u$, is placed across the mouth of the bucket, through which passes the valve-stem $n$.

The construction of the bucket is clearly shown in Fig. 3. $a$ and $b$ are the distilling and brewing vessels. $c$ and $x$ are the cooling-vessels. $d$ is the heating-pipe, which is placed in vessels $a$ and $b$, passing around and down in vessel $a$, and around and up in vessel $b$, passing out near the top. Each of the vessels $a$, $b$, and $x$ are furnished with a suitable lid. To the lids of vessels $a$ and $b$ are attached the conducting-pipes $e$ and $f'$. It will be observed that the conducting-pipe $e$ extends down near the bottom of vessel $b$, and the pipe $f'$ is attached to the condensing-pipe $f$.

Vessel $a$ is furnished with a stirrer, which consists of a perpendicular shaft, $h$, placed in he center of the vessel $a$. On the lower end f the shaft $h$, near the bottom of the vessel $a$, placed a blade, which is slightly curved. he stirrer may be operated by means of a crank or other suitable device. The vessels $a$ and $x$ are united by a pipe marked $g$. (See Fig. 2.) The flow of liquor from the vessel $a$ into vessel $x$ may be regulated by placing a stop-cock in the pipe between the vessels $a$ and $x$.

The operation of my improvement is as follows: Having everything arranged as represented in the accompanying drawings, the heating-pipe $d$ being attached to a steam-boiler, the fermented liquor or mash is put into vessel $a$, and the steam let into the pipe $d$, which will heat the fermented liquor or mash, thereby causing a vapor to rise therefrom. This vapor will rise up and pass down in pipe $e$ to the bottom of vessel $b$. It will then rise up in vessel $b$ around the pipe $d$, which will heat the vapor. The heated vapor then passes into the condensing-pipe $f$, which is in vessel $c$, which should be filled with water for the purpose of keeping the pipe $f$ cool. The vapor is condensed in pipe $f$ and flows out through pipe $j$ into the bucket 6. The valve of the bucket should be set so as to allow a flow of liquor from it equal to the speed desired in distilling. If the distilling or brewing process is going on too rapid, the flow of the condensed vapor will be increased, which will increase the weight in the bucket, which will descend as the weight increases, thereby closing valve 3, which will shut off the steam from the heating-pipe $d$, thus regulating the heat and the distilling or brewing process. The liquor which flows from the bucket 6 through pipe $r$ may be conducted into the cooling-vessel $x$ by means of a suitable pipe or conductor. The stirrer should be operated sufficient to bring all parts of the fermented liquor or mash in contact with the heating-pipe. The fermented liquor or the liquor from the mash in brewing may be drawn off into the cooling-vessel $x$ at pleasure. The red arrows show the course of the steam through the heating-pipe $d$. The liquor, when drawn off into the cooling-vessel $x$, is treated in the ordinary manner.

The advantages of my improvement are as follows: First, economy in heat, time, and labor in the process of distilling and brewing; second, regularity in the process of distilling and brewing; third, the mixing of impure gases with the fermented liquor or mash by the action of the steam direct from the boiler is avoided by the use of the heating-pipe D; fourth, saving and condensing the vapor which rises from the mash, which is always lost in the old process of brewing.

Having thus described the nature, construction, and operation of my invention, what I claim as of my invention, and desire to secure by Letters Patent of the United States, is—

The arrangement of the heating-pipe $d$, condensing-pipe $f$, conducting-pipes $e$, $f'$, and $j$, stirrer $i$, and governor, in connection with the vessels $a$, $b$, $c$, and $x$, when arranged and constructed, substantially as herein described, for the purpose of distilling and brewing.

JOHN SLOAN.

Witnesses:
JAMES J. JOHNSTON,
GEORGE P. STECK.